UNITED STATES PATENT OFFICE.

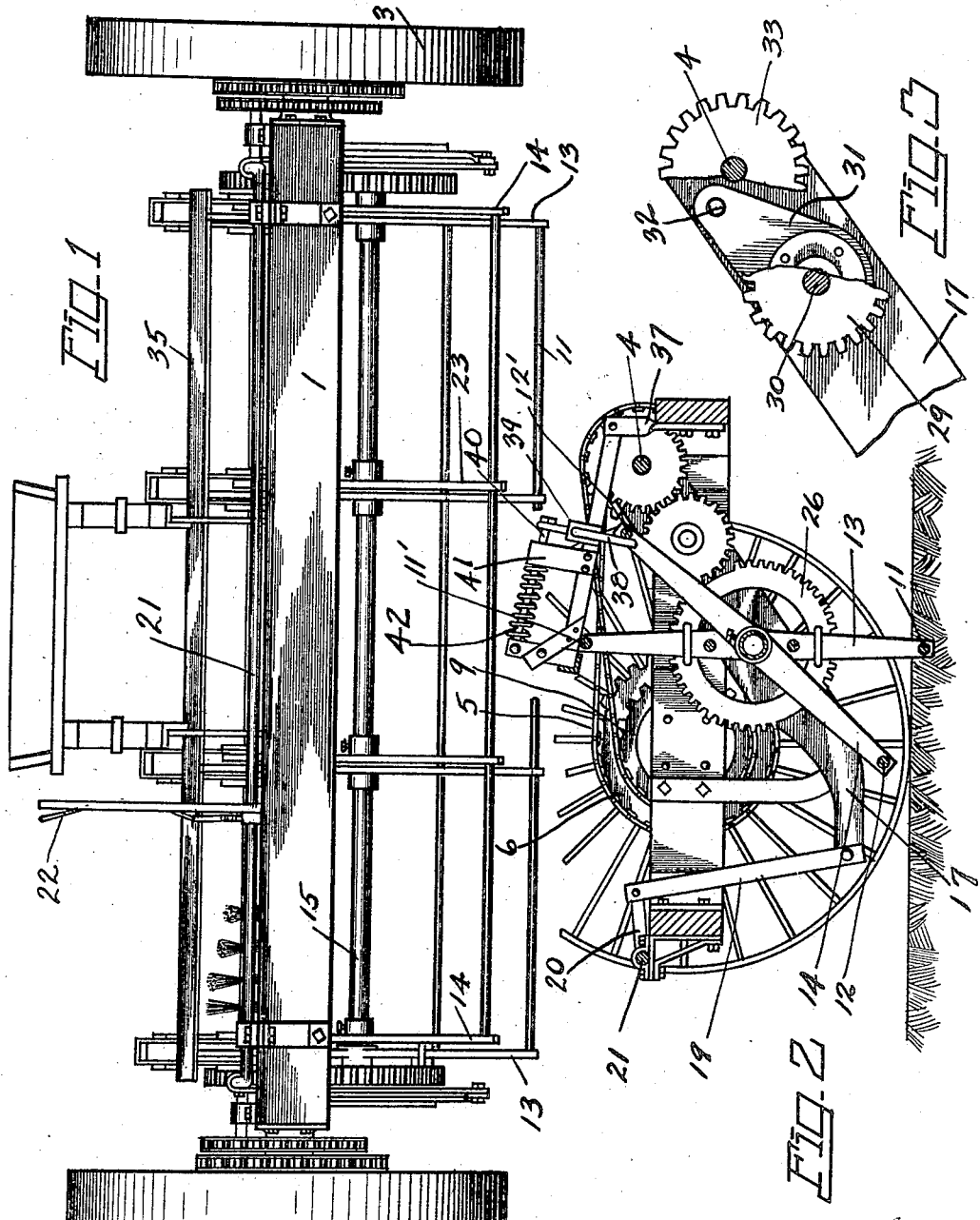

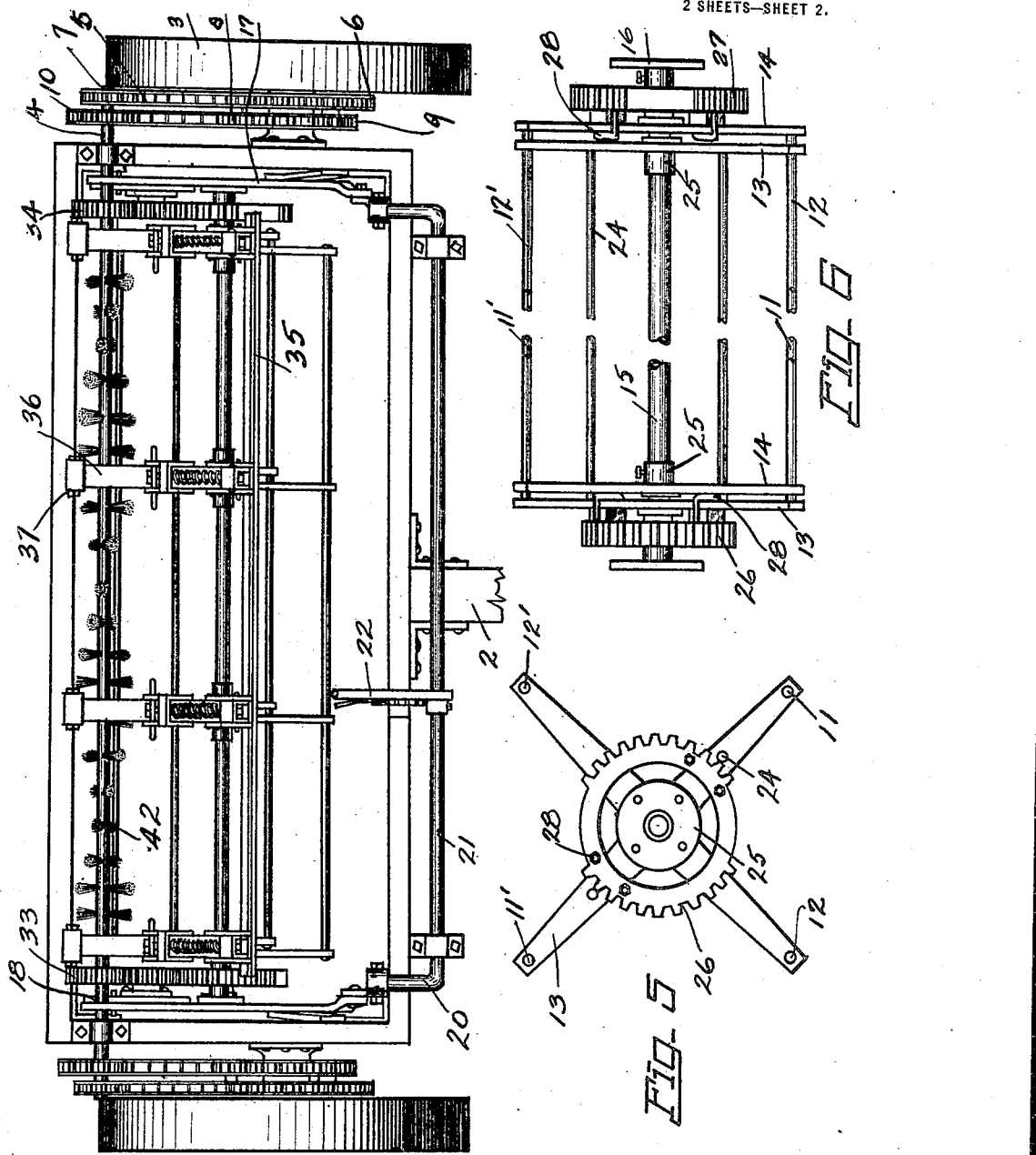

JOHN L. FLORIN, OF DAVENPORT, WASHINGTON.

WEEDING IMPLEMENT.

1,416,631.  Specification of Letters Patent.  Patented May 16, 1922.

Application filed October 18, 1921. Serial No. 508,564.

*To all whom it may concern:*

Be it known that I, JOHN L. FLORIN, a citizen of the United States, residing at Davenport, in Lincoln County and State of Washington, have invented certain new and useful Improvements in Weeding Implements, of which the following is a specification.

My present invention relates to an improved weeding implement designed especially for use in the cultivation of the soil, and specifically for the purpose of removing weeds from fallow ground and for mulching the plowed ground in preparation for the seeding operations. By the utilization of my invention the weeds are removed by their roots from the soil and dropped back to the surface thereof to form a mulch and thus enrich the soil, and the soil is pulverized and left in a loose condition for planting.

The invention consists in certain novel combinations and arrangements of parts involving intermittently and alternately rotary weeding devices, adapted to be held or retained in fixed operative position, released and removed therefrom and moved thereto, as a cycle of movement. The implement also utilizes means for adjusting the weeding devices at the proper depth below the surface of the soil and employs differential means for retaining the weeding devices in their respective operative positions. These and other features will be more specifically pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a view in rear elevation of a weeding implement involving the combinations and arrangements of the present invention.

Figure 2 is a transverse, vertical sectional view of the implement of Fig. 1.

Figure 3 is a detail view showing the transmission gears used in connection with interrupted gears for moving the spider frames forming the weeding devices.

Figure 4 is a top plan view of the implement, showing the draft tongue broken away.

Figure 5 is a detail end elevation of the two weeding devices forming the spider frame, showing also one of a pair of interrupted gears for moving the weeding devices into and out of operative position.

Figure 6 is a detail plan view, partly broken away, showing the weeding devices and the pair of interrupted gears, with connections.

In the preferred form of the invention as illustrated in the drawing, I utilize a rectangular, main frame, as 1 having a draft tongue 2, and supported by stub axles on the two traction wheels 3, 3. At the rear of the main frame and slightly above it is journaled a countershaft 4 parallel with the stub axles and driven from the hubs of the traction wheels through differential sprocket gearing as selected. Thus the pair of sprocket chains 5, 5 revolve the countershaft at high speed through the large sprockets 6 on the wheels 3 and the smaller sprocket wheels 7 on the countershaft; while the sprocket chains 8 revolve the countershaft at a lower speed through the sprocket wheels 9 on the traction wheel hubs and the sprocket wheels 10 on the countershaft. The required transmission may be selected and operated by suitable clutch mechanism for revolving the countershaft at either of the two speeds, for a purpose to be described.

There are two weeding devices, one of which is normally held in operative position while the other is held out of operative position and while in such position, the latter is cleaned or brushed of the accumulated weeds. These two weeding devices each comprises a pair of horizontally disposed rods as 11, 11' and 12, 12' as indicated in Fig. 2, the former rods being rigidly secured at the ends of a pair of bars 13 and the latter secured at the ends of a pair of complementary bars 14. Thus each weeding device is made up of a rectangular frame, and the two frames form a reel, while the rods 11 11' and 12 12' are designed to enter the ground, at selected times, just beneath the surface thereof for the purpose of tearing up the weeds by the roots, as the implement is being drawn over the ground One only of the rods is held in operative position beneath the surface of the soil, while the other three rods are held in inoperative position, and at the same time one of these three rods is being cleaned of weeds.

The spider frame is supported to revolve with a tubular shaft 15 at the ends of which are bearing brackets 16, and these bearing brackets or plates are attached and rigidly fixed to a pair of adjusting arms 17, 17, pivoted at 18 on the countershaft, for elevating or depressing the spider frame to bring the operative rod to proper distance below the surface of the soil.

At their free ends these arms have pivoted thereto the links 19, which are in turn pivoted to the rock arms 20 of a rock shaft 21, and the rock shaft 21, which extends transversely of the implement and is journaled in the main frame 1 may be rocked by moving the operative lever 22 in manner well understood.

The weeding rods 11 11' and 12 12' may be strengthened and braced by the utilization of intermediate braces 23 connecting the respective rods in pairs, and longitudinal brace rods, parallel with the rods, as indicated at 24 may also be used, to insure the required rigidity in the structure of the spider frame. The end arms and the intermediate braces are supported on the shaft 15 by means of hub disks or collars 25, and the reel is intermittently rotated by a pair of interrupted gears or mutilated gear wheels 26 and 27 at the respective ends of the shaft, one of which is connected to an end arm of a weeding device by the pairs of U-bolts 28. As will be seen from the drawings each mutilated gear has a pair of diametrically opposed smooth faces and a pair of diametrically disposed toothed faces, and upon reference to Figure 6 it will be seen that the smooth faces of one gear are alined with the toothed faces of the gear at the opposite end of the spider frame. Each mutilated gear is revolved from the countershaft 4 through an intermediate idler gear 29 whose shaft 30 is carried at the free end of a swinging bearing arm or plate 31 which is pivoted at 32 on one of the adjusting arms 17, and the respective trains of gears are driven by the driving gears 33, and 34. The intermediate or idler gears 29 are provided with swinging bearings which permit these gears to hang in position to mesh with the teeth on the mutilated gears as the latter gears turn in the same direction as the traction wheels turn, in order that the idler gears may not ride on the teeth of the mutilated gears and may readily be freed therefrom.

Thus, with the spider frame in the position of Fig. 2, the rod 11 is being drawn to the left through the soil just beneath its surface, and is held in fixed rigid position for a predetermined interval, to tear up the weeds by their roots, and loosen the soil. The two driving wheels are revolving their idler wheels, but the rod 11 may be held stationary because of the fact that its mutilated gear 26 is not engaged by its idler wheel. The arm 14 and its rods 12 12' are being revolved on the shaft 15 because of the position of the idler whose teeth are in engagement with the teeth of the mutilated gear 27.

The fixed or stationary weeding device is retained in operative position by means of a detent bar 35, which is an angle iron extending transversely of the implement, located above the main frame, and pivoted by a series of supporting arms 36, on brackets 37 attached to the rear cross bar of the main frame of the implement. The detent bar hangs by gravity over the path of movement of the two weeding devices, and is adapted to successively engage and retain the top rod of the weeding devices as they are revolved on their common shaft.

Each supporting arm 36 carries a trip lever 38 pivoted in a bracket 39 on the arm with its free end in the path of movement of the top bars of the weeding devices, as seen in Fig. 2, and as the rod 12' engages said trip lever the movement of the rod swings the detent bar 35 away from the rod 11' to release the latter. The contact of the rod with the trip lever is cushioned by providing a resilient connection between the lever and the detent bar which comprises a bolt 40 connected to the lever arm and supported in a bracket 41 on the detent arm, and a spring 42 on the bolt bearing against this bracket cushions the movement of the lever when the latter is contacted by the rod 12'. The trip lever possesses sufficient rigidity to cause the detent bar to be lifted from the rod 11', but the spring or cushion reduces the impact or the effect of the impact of the rod on the detent bar.

As illustrated there are four trip levers, each of which performs the function of assisting in the release of the stationary weeding device in order that the latter may be freed at the proper time, and as the device is released, the forward movement of the traveling implement will cause the rod 11 to swing to the rear, bringing the toothed portion of the mutilated gear 26 into position for engagement with the intermediate idler. The action of the idler causes the arms 13 to swing to the position of the arms 14 in Fig. 2, and the rod 11 is detained by the trip levers, and while in this position, the weeds may be brushed from the rod by the tufts 42 that may conveniently be carried by the rotating countershaft 4, for this purpose.

In this manner the two weeding devices are successively and intermittently moved to and from operative position, the rods of the devices alternating in their work, as for instance, it will be apparent that when the rod 11 is swung to inoperative position, the rod 12 will immediately follow it to operative position, and the detent bar will hold the rod 12' to station the rod 12 in working position.

The mutilated gears and pairs of complementary rods of the reel are relatively arranged with respect to the detent bar and trip levers to insure the retention of a weeding device in operative stationary position for the desired interval, while the inoperative device is revolving, and when the working device is released it is turned by obstruction from the ground, and its gearing is then engaged and it is revolved.

When the working device is released, the gearing revolves this device approximately 180 degrees, and the weeding devices are thus changed in their position. The engagement of the idler gear with its mutilated gears serves to first introduce the weeding rod into the ground, and then the action of the forwardly moving implement forces the weeding device to operative position. Upon assuming the vertical position the weeding device is immediately engaged by the detent bar and held stationary. In this manner the two weeding devices of the reel are intermittently revolved, and alternately held in stationary, operative, position, and the weeding rods successively pass through the soil at the required distance below the surface. The rods tear up the weeds by their roots, and the weeds are brushed from the rods by the revolving brush 42. In this manner the weeds are removed from the soil and the soil is cultivated and prepared for planting.

From the above description taken into connection with my drawings, it will be evident that I have provided an implement of this character which is comparatively simple in construction, facile in operation, and comparatively inexpensive in cost of production.

Having thus fully described my invention, what I claim and desire to secure by Letters Patent is:—

1. In a weeding implement the combination with a rotary reel comprising a plurality of relatively movable weeding devices, of means for intermittently rotating said devices, and means for alternately holding said devices stationary in operative position.

2. In a weeding implement the combination with a main frame and traction wheels, of a rotary reel and adjustable supporting means therefor, said reel comprising a pair of relatively movable weeding devices, and means actuated from said wheels for intermittently rotating said devices and for alternately holding said devices in stationary operative position.

3. In a weeding implement the combination with a main frame and traction wheels, of a pair of adjustable supporting arms in said frame, a rotary reel supported in said arms and comprising a pair of relatively movable weeding devices, actuating means connected with said traction wheels, and mutiliated gear couples in connection with said actuating means for rotating said reel.

4. The combination in an implement as described of a reel means for rotating said reel, said reel comprising relatively movable rectangular weeding frames, and means for alternately retaining said weeding frames in stationary operative position.

5. The combination in an implement as described with a rotary reel comprising relatively movable weeding frames, a mutilated gear on each frame, and driving gears connected with said mutilated gears for alternately revolving said frames.

6. The combination in an implement as described with a supporting axle of a pair of rotatable and relatively movable weeding devices on said axle, a mutilated gear on each device, a main frame and traction wheels, and operative connections from said traction wheels to said mutilated gears for alternately revolving said weeding devices.

7. The combination in an implement as described with a pair of rotatable and relatively movable weeding devices, a pair of adjustable supporting arms, an axle in said arms and supporting said devices, a mutilated gear wheel on each device, a main frame, a pair of traction wheels, operative connections between said traction wheels and mutilated gears for intermittently revolving said devices, and a detent for engaging and holding successively said devices in operative position.

In testimony whereof I affix my signature.

JOHN L. FLORIN.